(12) United States Patent
Abedini et al.

(10) Patent No.: US 12,464,549 B2
(45) Date of Patent: Nov. 4, 2025

(54) REPEATER CONFIGURATION FOR FLEXIBLE RESOURCES

(71) Applicant: QUALCOMM Incorporated, San Diego, CA (US)

(72) Inventors: Navid Abedini, Basking Ridge, NJ (US); Tao Luo, San Diego, CA (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/936,712

(22) Filed: Sep. 29, 2022

(65) Prior Publication Data

US 2024/0114538 A1 Apr. 4, 2024

(51) Int. Cl.
*H04W 72/23* (2023.01)
*H04W 72/0446* (2023.01)
*H04W 72/20* (2023.01)
*H04W 72/53* (2023.01)
*H04W 74/0808* (2024.01)

(52) U.S. Cl.
CPC .......... *H04W 72/53* (2023.01); *H04W 72/20* (2023.01)

(58) Field of Classification Search
None
See application file for complete search history.

(56) References Cited

U.S. PATENT DOCUMENTS

| | | | | |
|---|---|---|---|---|
| 10,660,091 | B2 * | 5/2020 | Huang | H04W 72/0446 |
| 2019/0140776 | A1 * | 5/2019 | Seo | H04B 7/0456 |
| 2019/0268923 | A1 | 8/2019 | Sundararajan et al. | |
| 2020/0045715 | A1 * | 2/2020 | Li | H04W 72/1263 |
| 2020/0187230 | A1 * | 6/2020 | Xia | H04L 5/00 |
| 2021/0314910 | A1 * | 10/2021 | Rune | H04L 5/0094 |
| 2022/0038919 | A1 * | 2/2022 | Wang | H04L 5/0023 |
| 2022/0116152 | A1 * | 4/2022 | Iyer | H04L 1/1896 |
| 2022/0303108 | A1 * | 9/2022 | Faxér | H04L 5/1461 |
| 2023/0247647 | A1 * | 8/2023 | Kumagai | H04W 72/232 370/329 |
| 2024/0147472 | A1 * | 5/2024 | Wei | H04W 72/1268 |
| 2024/0429994 | A1 * | 12/2024 | Moon | H04B 7/06968 |

FOREIGN PATENT DOCUMENTS

EP 3574697 B1 6/2021

OTHER PUBLICATIONS

International Search Report and Written Opinion—PCT/US2023/075095—ISA/EPO—Jan. 25, 2024.

* cited by examiner

*Primary Examiner* — Sai Aung
(74) *Attorney, Agent, or Firm* — Harrity & Harrity LLP/Qualcomm Incorporated

(57) ABSTRACT

Various aspects of the present disclosure generally relate to wireless communication. In some aspects, a network node may receive information identifying a resource as a flexibly assigned resource, wherein the flexibly assigned resource is usable for an uplink or a downlink. The network node may resolve the resource based at least in part on a direction of one or more other resources preceding or succeeding the resource. Numerous other aspects are described.

30 Claims, 8 Drawing Sheets

REPEATER CONFIGURATION FOR FLEXIBLE RESOURCES

FIELD OF THE DISCLOSURE

Aspects of the present disclosure generally relate to wireless communication and to techniques and apparatuses for repeater configuration for flexible resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Tenn Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a network node. The method may include receiving information identifying a resource as a flexibly assigned resource, wherein the flexibly assigned resource is usable for an uplink or a downlink. The method may include resolving the resource based at least in part on a direction of one or more other resources preceding or succeeding the resource.

Some aspects described herein relate to a network node for wireless communication. The network node may include a memory and one or more processors coupled to the memory. The one or more processors may be configured to receive information identifying a resource as a flexibly assigned resource, wherein the flexibly assigned resource is usable for an uplink or a downlink. The one or more processors may be configured to resolve the resource based at least in part on a direction of one or more other resources preceding or succeeding the resource.

Some aspects described herein relate to a non-transitory computer-readable medium that stores a set of instructions for wireless communication by a network node. The set of instructions, when executed by one or more processors of the network node, may cause the network node to receive information identifying a resource as a flexibly assigned resource, wherein the flexibly assigned resource is usable for an uplink or a downlink. The set of instructions, when executed by one or more processors of the network node, may cause the network node to resolve the resource based at least in part on a direction of one or more other resources preceding or succeeding the resource.

Some aspects described herein relate to an apparatus for wireless communication. The apparatus may include means for receiving information identifying a resource as a flexibly assigned resource, wherein the flexibly assigned resource is usable for an uplink or a downlink. The apparatus may include means for resolving the resource based at least in part on a direction of one or more other resources preceding or succeeding the resource.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
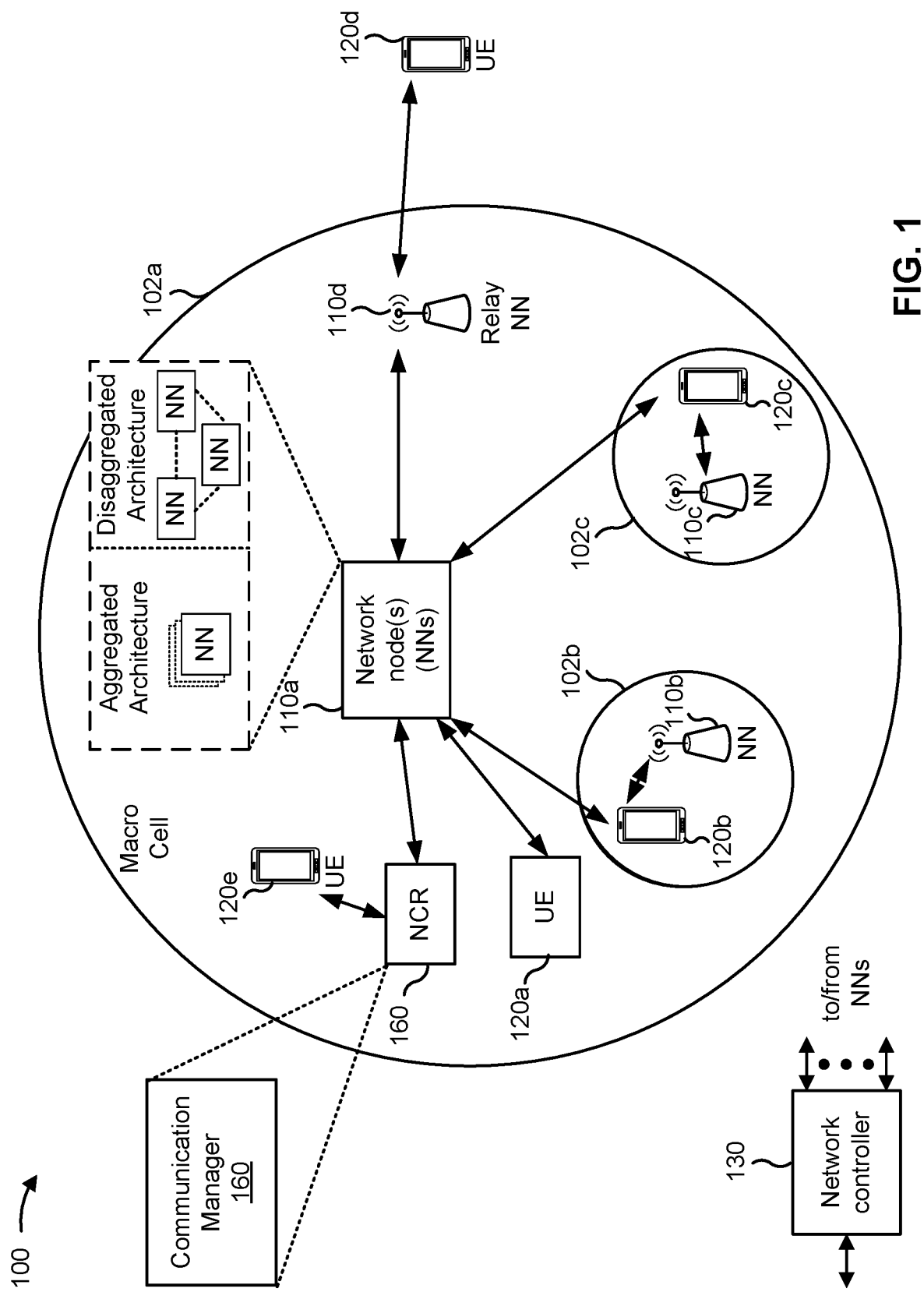
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. Additionally, or alternatively, the wireless network 100 may include a network controlled repeater (NCR) 160. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, the network controlled repeater 160 (e.g., which may be a network node, such as a network node 110, a UE 120, or another wireless communication device) may forward communications between two wireless communication devices (e.g., shown as the network node 110*a* and the UE 120*e*). In some aspects, the network controlled repeater 160 may be a millimeter wave (mmW) repeater and may receive a millimeter wave signal (e.g., an analog millimeter wave signal) from a network node 110, may amplify the millimeter wave signal, and may transmit the amplified millimeter wave signal to one or more UEs 120 (e.g., shown as UE 120*e*). In some aspects, the network controlled repeater 160 may be an analog mmW repeater, sometimes also referred to as a layer 1 mmW repeater. Additionally, or alternatively, the network controlled repeater 160 may be a wireless transmit receive point (TRP) acting as a distributed unit (e.g., of a 5G access node) that communicates wirelessly with a network node 110 acting as a central unit or an access node controller (e.g., of the 5G access node). The network controlled repeater 160 may receive, amplify, and transmit the analog mmW signal without performing analog-to-digital conversion of the analog mmW signal and/or without performing any digital signal processing on the mmW signal. In this way, latency may be reduced and a cost to produce the network controlled repeater 160 may be reduced.

Additionally, or alternatively, two or more UEs may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network controlled repeater 160 may include a communication manager 162. As described in more detail elsewhere herein, the communication manager 162 may receive information identifying a resource as a flexibly assigned resource, wherein the flexibly assigned resource is usable for an uplink or a downlink; and resolve the resource based at least in part on a direction of one or more other resources preceding or succeeding the resource. Additionally, or alternatively, the communication manager 162 may perform one or more other operations described herein.

As indicated above, FIG. 1 is provided as an example. Other examples may differ from what is described with regard to FIG. 1.

Figure 2:
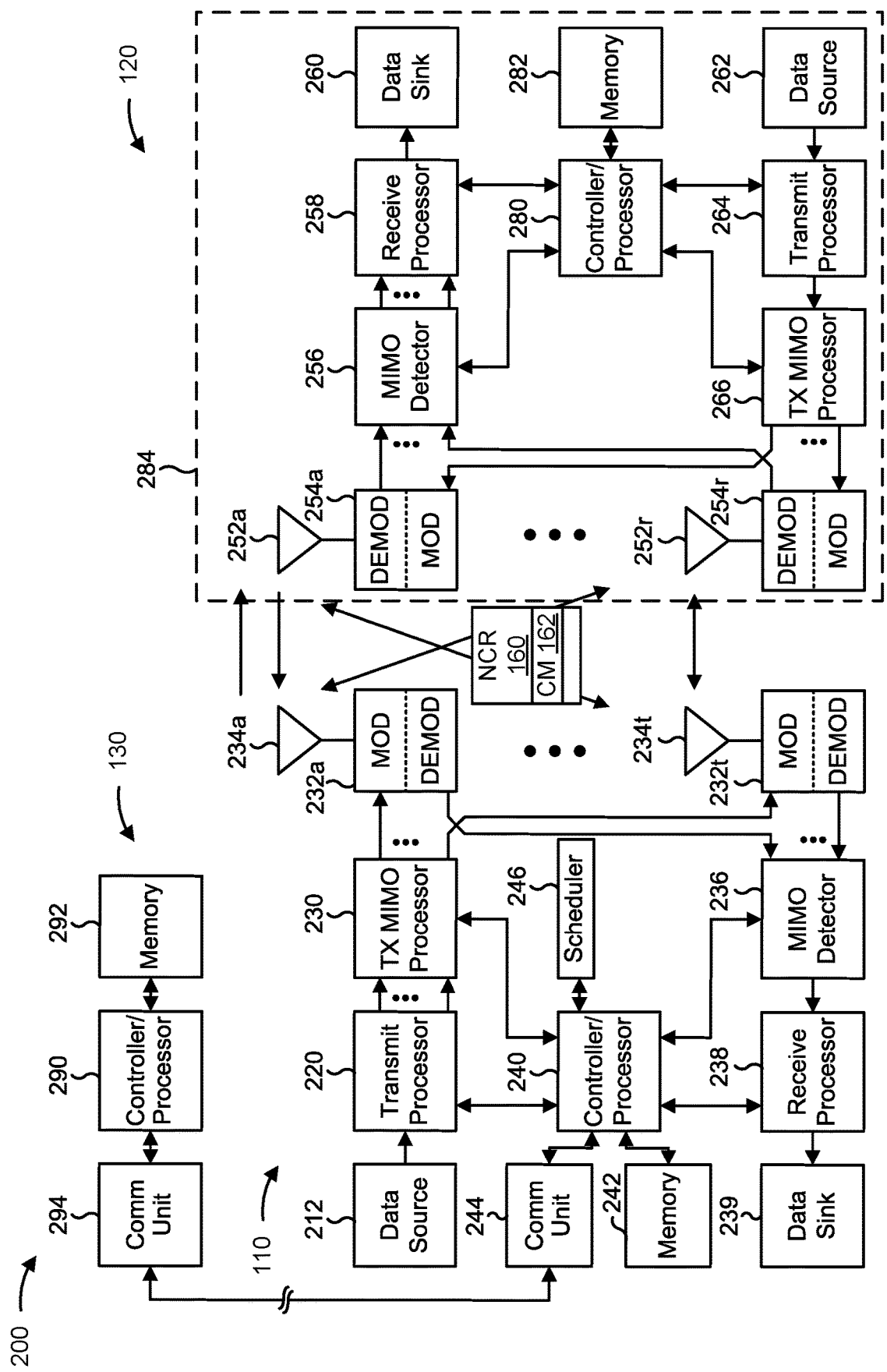
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

The network controlled repeater 160 may include a one or more components described with regard to one or more other devices of FIG. 2 for, for example, forwarding communications between the network node 110 and the UE 120. For example, the network controlled repeater 160 may include a transmit process 220/264, a TX MIMO processor 230/266, a MOD/DEMOD 232/254, a MIMO detector 236/256, a receive processor 238/258, a controller/processor 240/280, or a memory 242/282. Although some aspects refer to a network controlled repeater 160 in terms of a network node (and a network controlled repeater 160 may be a component of a disaggregated base station, as described in more detail herein), it is contemplated that a network controlled repeater may be implemented via another wireless communication device, such as a UE.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-8). The controller/processor 240 of the network node 110, the controller/processor 280 of the UE 120, and/or any other component(s) of FIG. 2 may perform one or more techniques associated with repeater configuration for flexible resources, as described in more detail elsewhere herein. In some aspects, the network controlled repeater 160 described herein is the network node 110 or the UE 120, is included in the network node 110 or the UE 120, or includes one or more components of the network node 110 or the UE 120 shown in FIG. 2. For example, the controller/processor 240 of the network node 110, the controller/processor 280 of the UE 120, and/or any other component(s) of FIG. 2 may perform or direct operations of, for example, process 700 of FIG. 7 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, the network controlled repeater 160 includes means for receiving information identifying a resource as a flexibly assigned resource, wherein the flexibly assigned resource is usable for an uplink or a downlink (e.g., using communication manager 162, antennas 234/252, DEMODs 232/254, MIMO detectors 256/236, receive processors 238/258, or controller/processors 240/280; and/or means for resolving the resource based at least in part on a direction of one or more other resources preceding or succeeding the resource (e.g., using communication manager 162 or controller/processors 240/280). In some aspects, the means for the network controlled repeater 160 to perform operations described herein may include, for example, one or more of communication manager 162, transmit processor 220, TX MIMO processor 230, modem 232, antenna 234, MIMO detector 236, receive processor 238, controller/processor 240, memory 242, scheduler 246, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
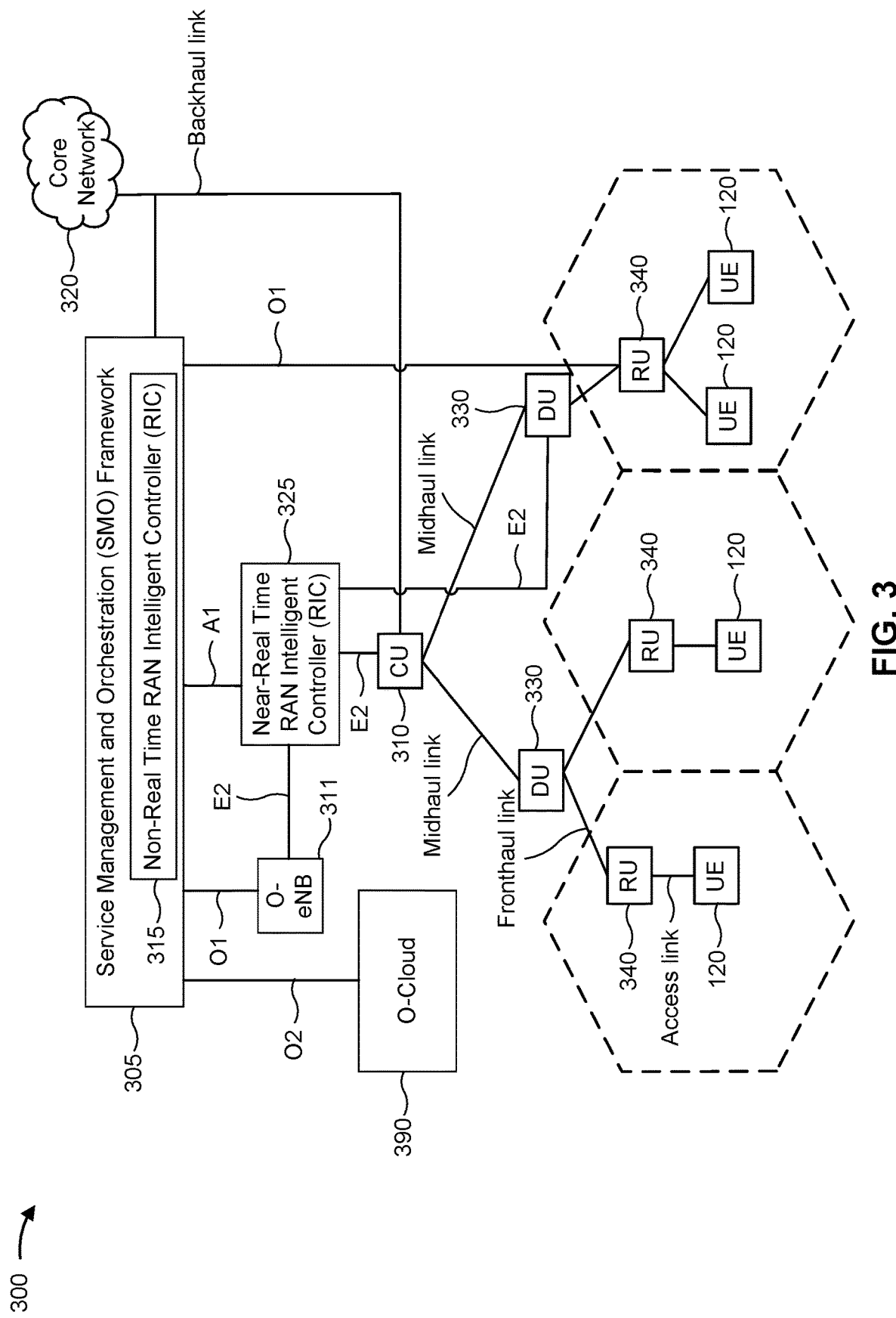
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. In some examples, one or more of the units may correspond to a network controlled repeater, such as the network controlled repeater 160. Additionally, or alternatively, a network controlled repeater may forward communications between one or more of the units and the UE 120. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
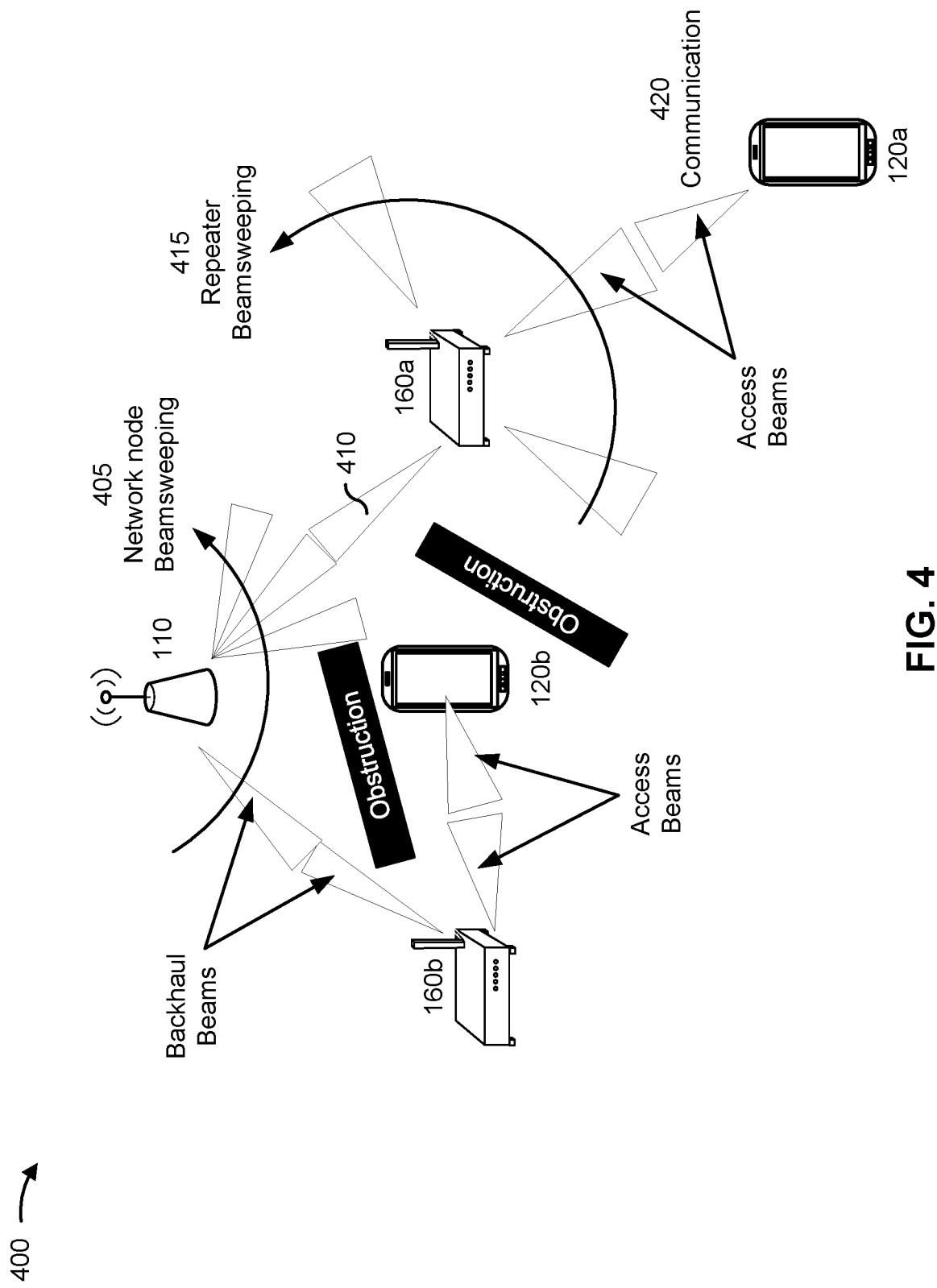
FIG. 4 is a diagram illustrating an example of communicating using a millimeter wave repeater, in accordance with the present disclosure.

FIG. 4 is a diagram illustrating an example 400 of communicating using a millimeter wave repeater, in accordance with the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a network node 110 that communicates using the sub-6 GHz radio waves. However, a millimeter wave may not be capable of penetrating the same wall (e.g., depending on a thickness of the wall and/or a material from which the wall is constructed). Some techniques and apparatuses described herein use a network controlled repeater 160 (which includes, in the example of FIG. 4, repeater 160a and repeater 160b) to increase the coverage area of a network node 110 and/or to extend coverage to UEs 120 (which include, in the example of FIG. 4, UE 120a and UE 120b) without line of sight to the network node 110 (e.g., due to an obstruction).

For example, as illustrated in the example of FIG. 4, an obstruction between UE 120b and network node 110 blocks or otherwise reduces the quality of a link between the network node 110 and UE 120b. Similarly, an obstruction between UE 120b and repeater 160a blocks or otherwise reduces the quality of a link between the repeater 160a and the UE 120b. However, no obstructions or fewer obstructions exist between repeater 160b and UE 120b, and, as such, it is possible that communications between repeater 160b and UE 120b will have a higher quality than communications between network node 110 and UE 120b or between repeater 160a and UE 120b. Furthermore, the network controlled repeater 160 described herein may be a layer 1 or an analog millimeter wave repeater, which is associated with a lower cost, less processing, and lower latency than a layer 2 or layer 3 repeater.

A network controlled repeater 160 (sometimes referred to herein as a repeater 160) may perform directional communication by using beamforming to communicate with a network node 110 via a first beam pair (e.g., a backhaul beam pair over a backhaul link with the network node 110) and to communicate with a UE 120 via a second beam pair (e.g., an access beam pair over an access link with the UE 120). For example, in example 400, repeater 160a can communicate with network node 110 via a first beam pair and can communicate with UE 120a via a second beam pair. Similarly, repeater 160b can communicate with network node 110 via a first beam pair and can communicate with UE 120a via a second beam pair. "Beam pair" may refer to a transmit (Tx) beam used by a first device for transmission and a receive (Rx) beam used by a second device for reception of information transmitted by the first device via the Tx beam.

As shown by reference number 405, a network node 110 may use a beamsweeping procedure to transmit communications via multiple beams over time (e.g., using time division multiplexing (TDM)). As shown by reference number 410, the repeater 160a may receive a communication via an Rx beam of the repeater 160a. As shown by reference number 415, the repeater 160a may relay each received communication via multiple Tx beams of the repeater 160a (e.g., using TDM). As used herein, "relaying a communication" may refer to transmitting the received communication (e.g., after amplifying the received communication) without decoding the received communication and/or without modifying information carried in the received communication. Alternatively, "relaying a received communication" may refer to transmitting the received communication after decoding the received communication and/or modifying information carried in the received communication. In some aspects, a received communication may be relayed using a different time resource, a different frequency resource, and/or a different spatial resource (e.g., a different beam) to transmit the communication as compared to a time resource, a frequency resource, and/or a spatial resource in which the communication was received. As shown by reference number 420, a UE 120a may receive a relayed communication. In some aspects, the UE 120a may generate a communication to be transmitted to the network node 110. The UE 120a may then transmit the communication to the repeater 160a for relaying to the network node 110.

As indicated above, FIG. 4 is provided as an example. Other examples may differ from what is described with regard to FIG. 4.

Figure 5:
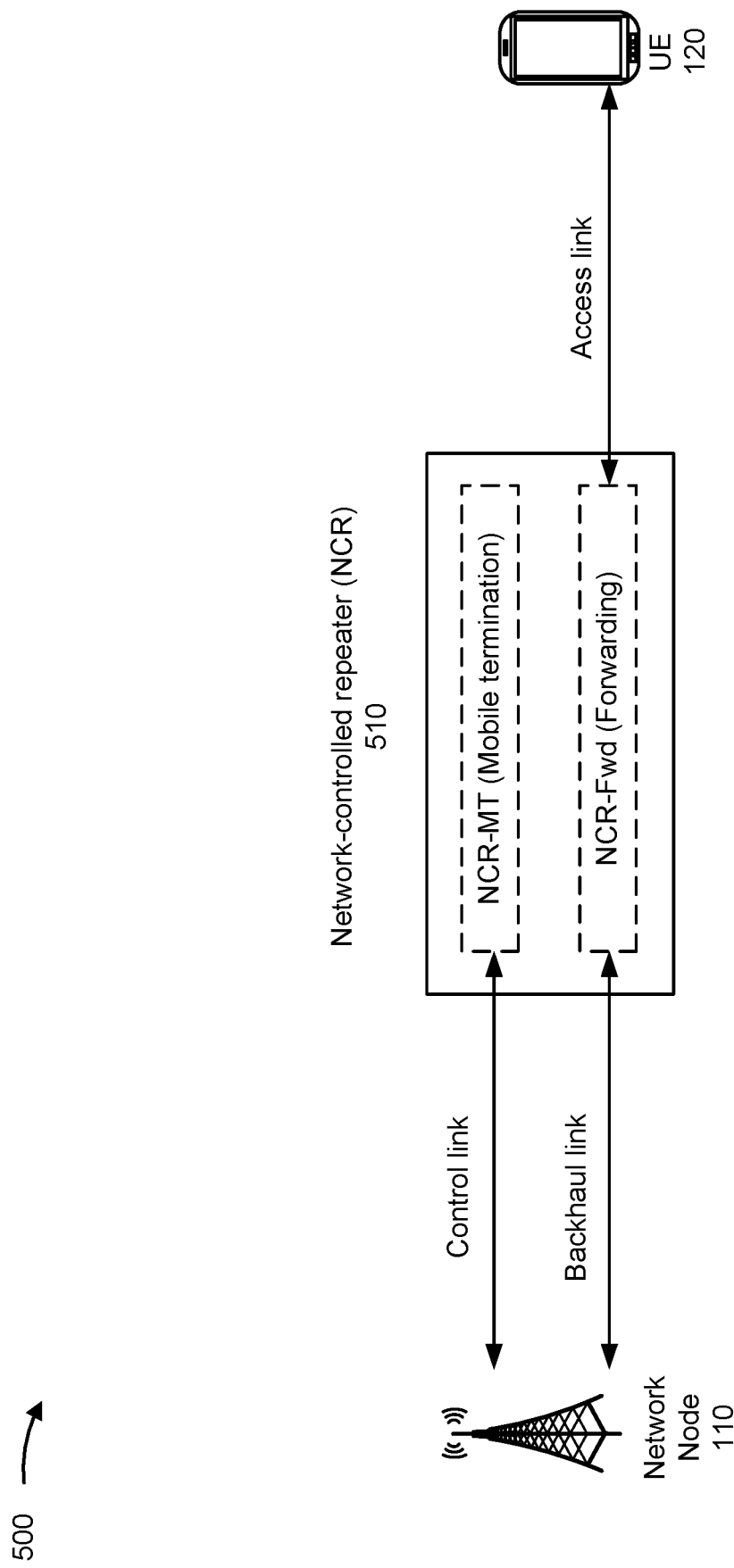
FIG. 5 is a diagram illustrating an example of a network controlled repeater, in accordance with the present disclosure.

FIG. 5 is a diagram illustrating an example 500 of a network controlled repeater, in accordance with the present disclosure. As shown in FIG. 5, a network node 110 and a UE 120 may communicate via a network controlled repeater (NCR) 510 (e.g., which may correspond to the network controlled repeater 160). The network controlled repeater 510 may communicate with the network node 110 on a control link and on a backhaul link. The network controlled repeater 510 may communicate with the UE 120 via an access link. In some examples, the network controlled repeater 510 may have a set of planes associated with the communication links, such as a mobile termination (MT) plane (e.g., an NCR-MT layer) or a control plane corresponding to the control link and a forwarding (Fwd) plane (e.g., an NCR-Fwd layer) or access plane corresponding to the backhaul link and the access link.

As indicated above, FIG. 5 is provided as an example. Other examples may differ from what is described with respect to FIG. 5.

A network controlled repeater may operate in a time division duplexing (TDD) communication system, in which the network controlled repeater forwards downlink traffic (e.g., from a network node to a UE) in some resources and uplink traffic (e.g., from the UE to the network node) in other resources. However, to preserve scheduling flexibility, one or more resources may be assigned as flexible resources, which may also be referred to as "flexibly assigned resources" or "F" resources (in contrast to downlink ("D") resources and uplink ("U") resources). However, when a network controlled repeater receives information identifying a resource as flexible, the network controlled repeater may lack information indicating which direction is being used by the UE and the network node for communication. Because the network controlled repeater tunes an antenna to receive from the network node (e.g., for forwarding to the UE or for receiving control information for the network controlled repeater) or to receive from the UE (e.g., for forwarding to the network node), if the network controlled repeater selects an incorrect direction for a flexible resource, the network controlled repeater may drop a communication, resulting in poor communication performance.

Some aspects described herein enable a network controlled repeater to resolve a direction of a flexible resource. For example, the network controlled repeater may be configured with a rule for resolving the flexible resource based at least in part on one or more resources preceding the flexible resource or one or more resources succeeding the flexible resource. In other words, as an example of a rule, if a resource immediately before the flexible resource is a downlink resource, the network controlled repeater may interpret the flexible resource as a downlink resource. As another example of a rule, if a resource immediately after the flexible resource is an uplink resource, the network controlled repeater may interpret the flexible resource as an uplink resource. Other examples of rules, as described herein, may be possible. Additionally, or alternatively, the network controlled repeater may resolve a flexible resource based on a timing of the flexible resource, a backhaul beam indication, a default configuration, or a type of slot format indicator. In this way, the network controlled repeater can deterministically resolve the flexible resource, thereby reducing a likelihood that the network controlled repeater incorrectly tunes an antenna and drops a communication.

Figure 6:
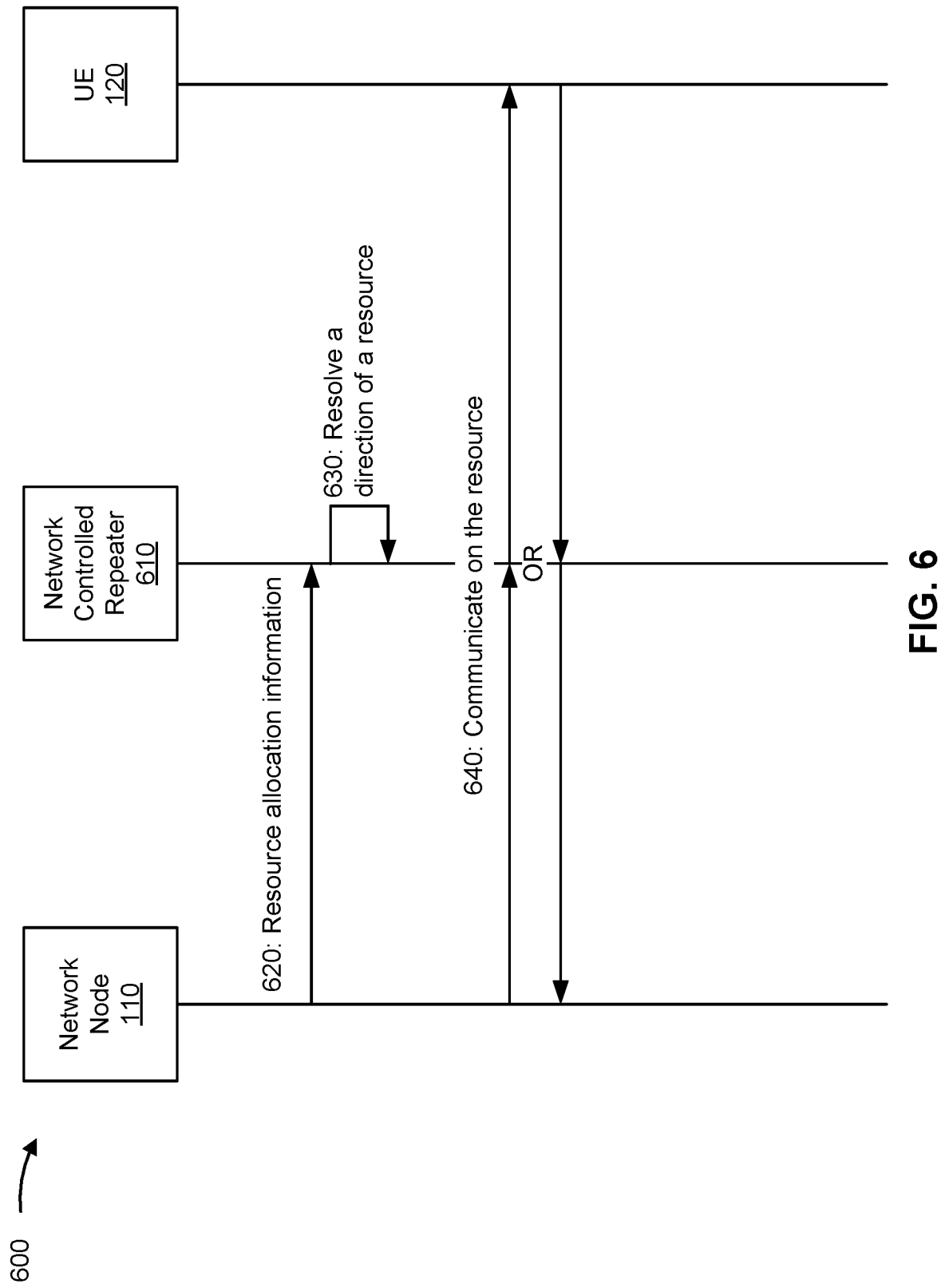
FIG. 6 is a diagram illustrating an example associated with repeater configuration for flexible resources, in accordance with the present disclosure.

FIG. 6 is a diagram illustrating an example 600 associated with repeater configuration for flexible resources, in accordance with the present disclosure. As shown in FIG. 6, example 600 includes communication between a network node 110, a network controlled repeater 610 (e.g., which may correspond to the network controlled repeater 160 or the network controlled repeater 510), and a UE 120.

As further shown in FIG. 6, and by reference number 620, the network controlled repeater 610 may receive resource allocation information. For example, the network controlled repeater 610 may receive information identifying a resource as a flexibly assigned resource. In some aspects, the network controlled repeater 610 may receive information identifying one or more resources proximate to the flexibly assigned resource. For example, the network controlled repeater 610 may receive information identifying a direction of one or more resources preceding a flexible resource or succeeding a flexible resource. Additionally, or alternatively, the network controlled repeater 610 may receive (e.g., with the resource allocation information or in a separate configuration message) information identifying a rule for resolving a direction of the flexible resource, a default configuration for the flexible resource, a backhaul beam indication, or a configured latency, among other examples, as described in more detail herein.

In some aspects, the network node 110 may transmit (e.g., via the network controlled repeater 610) one or more slot format indicators (SFIs). For example, the UE 120 may receive a plurality of SFIs associated with a plurality of serving cells (e.g., in a downlink control information (DCI) format 2-0 message). In some aspects, the network controlled repeater 610 may identify that one or more SFIs, transmitted by the network node 110, are associated with an NCR-MT layer or entity of the network controlled repeater 610, rather than a serving cell of the network controlled repeater 610. The network controlled repeater 610 may identify the one or more SFIs associated with the NCR-MT layer based at least in part on associated radio resource control (RRC) configuration information (e.g., configuring one or more slot format combinations, locations in the DCI format 2-0, or reference subcarrier spacings, among other examples that are to be associated with an NCR-Fwd layer or entity). In this case, the network controlled repeater 610 may process the one or more SFIs to determine one or more configurations for one or more passbands for which the network controlled repeater 610 is to forward signals.

As further shown in FIG. 6, and by reference number 630, the network controlled repeater 610 may resolve a direction of the resource. For example, the network controlled repeater 610 may determine whether the resource is to be used as an uplink resource or a downlink resource. In some aspects, the network controlled repeater 610 may determine whether the resource is to be used as an uplink resource or a downlink resource based at least in part on an indication of a rule for resolving a direction of the resource. For example, the network controlled repeater 610 may receive, from the network node 110, information indicating which of the following example rules the network controlled repeater 610 is to follow when resolving the direction of the resource. Additionally, or alternatively, the network controlled repeater 610 may transmit, to the network node 110, information indicating which of the following example rules the network controlled repeater 610 will follow. In this case, the network node 110 may coordinate with the UE 120 to resolve the flexible resource using the same rule (e.g., to maintain synchronization between the network node 110, the UE 120, and the network controlled repeater 610).

In some aspects, the network controlled repeater 610 may resolve the direction of the resource based at least in part on a direction of one or more other resources. For example, the network controlled repeater 610 may be configured with a rule that the direction of a flexible resource is based at least in part on one or more resources immediately preceding or immediately succeeding the flexible resource. As a first example of such a rule, when one or more flexible resources succeeds a set of downlink resources, the network controlled repeater 610 may resolve the one or more flexible resources as one or more downlink resources. In contrast, when the one or more flexible resources succeed a set of uplink resources, the network controlled repeater 610 may resolve the one or more flexible resources as one or more uplink resources.

As a second example of such a rule, when the one or more flexible resources precede a set of downlink resources, the network controlled repeater 610 may resolve the one or more flexible resources as one or more downlink resources. In contrast, when the one or more flexible resources precede a set of uplink resources, the network controlled repeater 610 may resolve the one or more flexible resources as one or more uplink resources. As a third example of such a rule, when the one or more flexible resources succeed a first set of downlink resources and precede a second set of downlink resources, the network controlled repeater 610 may resolve the one or more flexible resources as one or more downlink resources. In contrast, when the one or more flexible resources succeed a first set of uplink resources and precede a second set of uplink resources, the network controlled repeater 610 may resolve the one or more flexible resources as one or more uplink resources As a fourth example of such a rule, when the one or more flexible resources succeed a set of downlink resources and precede a set of uplink resources, the network controlled repeater 610 may resolve the one or more flexible resources as a gap period or off period (which may be termed an "OFF" or "O" resource). Similarly, when the one or more flexible resources succeed a set of uplink resources and precede a set of downlink resources, the network controlled repeater 610 may resolve the one or more flexible resources as a gap period or off period. The gap period or off period may be selected to provide a transition time for changing a tuning of an antenna of the network controlled repeater 610 from a first direction to a second direction (e.g., from uplink to downlink forwarding or from downlink to uplink forwarding).

As a fifth example of such a rule, when the network controlled repeater 610 is configured to forward bidirectionally, and when the one or more flexible resources are between a set of uplink resources and a set of downlink resources (e.g., as in the fourth example), the network controlled repeater 610 may determine to forward on both the downlink and the uplink (e.g., in different subcarriers or bands) on the one or more flexible resources.

In some aspects, the network controlled repeater 610 may resolve a direction of a flexible resource based at least in part on a timing of the flexible resource. For example, the network controlled repeater 610 may be configured (e.g., by the network node 110) with a minimum latency or gap between receiving control information from the network node 110 and downlink forwarding in accordance with the control information. Further, the minimum latency or gap may be different for downlink forwarding and for uplink forwarding. For example, the downlink forwarding minimum latency may be less than the uplink forwarding minimum latency as the network controlled repeater 610 does not need to change antenna tuning direction when receiving control information and then performing downlink forwarding (as opposed to receiving control information and performing uplink forwarding). Accordingly, when the network controlled repeater 610 receives and decodes sidelink control information identifying the flexible resource, but a gap between the sidelink control information and the flexible resource only satisfies the downlink forwarding minimum latency (and not the uplink forwarding minimum latency), the network controlled repeater 610 may determine (implicitly) that the flexible resource is a downlink resource.

In some aspects, the network controlled repeater 610 may receive sidelink control information, which may also be referred to as a side control message, that includes a backhaul beam indication. In this case, the backhaul beam indication may include information identifying an index value for a downlink backhaul beam or an uplink backhaul beam. In other words, although some backhaul beams may be configured to be usable for both downlink and uplink, other backhaul beams may be configured to be usable for only downlink or only uplink. Accordingly, if the network controlled repeater 610 receives a backhaul beam indication identifying a beam that is configured to be usable only for downlink, the network controlled repeater 610 may determine that the flexible resource is a downlink resource. In contrast, if the network controlled repeater 610 receives a backhaul beam indication identifying a beam that is configured to be usable only for uplink, the network controlled repeater 610 may determine that the flexible resource is a uplink resource. Additionally, or alternatively, the network controlled repeater 610 may receive information identifying a first quantity of uplink beam indices and a second quantity of downlink beam indices. In this case, the network controlled repeater 610 may determine the flexible resource as a direction with a higher quantity of indicated beam indices. In other words, if the network controlled repeater 610 receives information identifying more uplink beam indices than downlink beam indices, the network controlled repeater 610 may determine that the flexible resource is an uplink resource and vice versa.

In some aspects, the network controlled repeater 610 may determine a direction of a flexible resource based at least in part on a configured, default direction. For example, the network controlled repeater 610 may be configured with or may receive information identifying a default direction for flexible resources and may resolve any identified flexible resources as the default direction. In some aspects, the default direction may be configured on a beam specific basis, a sub-band specific basis, or a time resource specific basis, among other examples. For example, the network controlled repeater 610 may have a first default direction for a first sub-band and a second default direction for a second sub-band, and may resolve a flexible resource as the first default direction or the second default direction based at least in part on whether the flexible resource is in the first sub-band or the second sub-band.

As further shown in FIG. 6, and by reference number 640, the network controlled repeater 610 may communicate on the resource. For example, when the network controlled repeater 610 resolves the direction of the resource as the downlink direction, the network controlled repeater 610 may receive a downlink communication from the network node 110 and may forward the downlink communication to the UE 120. As another example, when the network controlled repeater 610 resolves the direction of the resource as the uplink direction, the network controlled repeater 610 may receive an uplink communication from the UE 120 and may forward the uplink communication to the network node 110. As another example, when the network controlled repeater 610 resolves the direction of the resource as both an uplink direction and a downlink direction, the network controlled repeater 610 may forward uplink and downlink communications in the flexible resource.

As indicated above, FIG. 6 is provided as an example. Other examples may differ from what is described with respect to FIG. 6.

Figure 7:
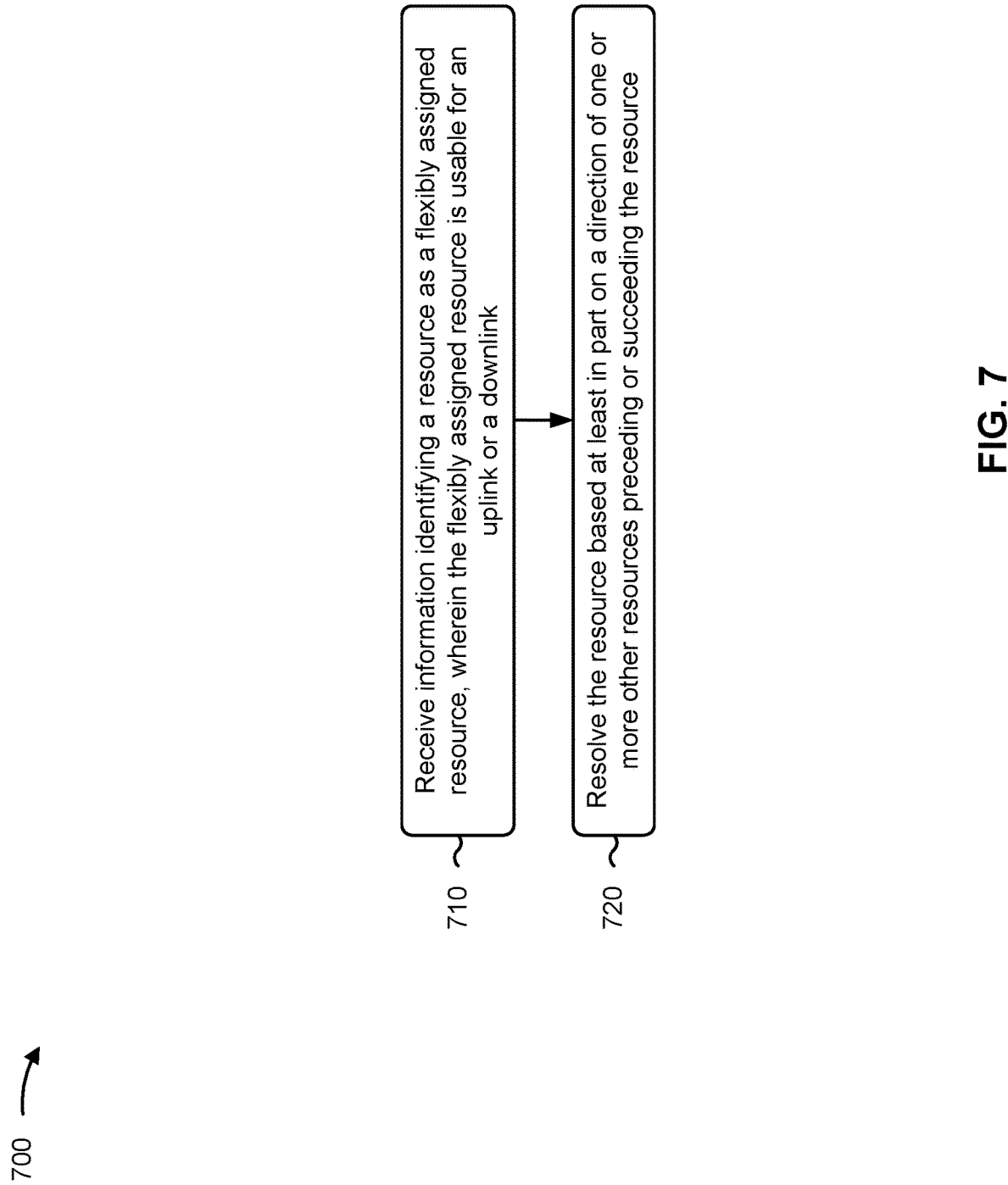
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., the network node 110, the UE 120, the network controlled repeater 160, the network controlled repeater 510, or the network controlled repeater 610) performs operations associated with repeater configuration for flexible resources.

As shown in FIG. 7, in some aspects, process 700 may include receiving information identifying a resource as a flexibly assigned resource, wherein the flexibly assigned resource is usable for an uplink or a downlink (block 710). For example, the apparatus (e.g., using communication manager 162 and/or reception component 802, depicted in FIG. 8) may receive information identifying a resource as a flexibly assigned resource, wherein the flexibly assigned resource is usable for an uplink or a downlink, as described above, for example, with reference to FIG. 6.

As further shown in FIG. 7, in some aspects, process 700 may include resolving the resource based at least in part on a direction of one or more other resources preceding or succeeding the resource (block 720). For example, the apparatus (e.g., using communication manager 162 and/or configuration component 808, depicted in FIG. 8) may resolve the resource based at least in part on a direction of one or more other resources preceding or succeeding the resource, as described above, for example, with reference to FIG. 6.

Process 700 may include additional aspects, such as any single aspect or any combination of aspects described below and/or in connection with one or more other processes described elsewhere herein.

In a first aspect, the one or more other resources preceding or succeeding the resource and sharing a common symbol or slot with the resource include one or more flexibly assigned resources, and process 700 includes communicating in the resource based at least in part on the direction of a symbol or slot preceding or succeeding the common symbol or slot.

In a second aspect, alone or in combination with the first aspect, the one or more other resources preceding or succeeding the resource include one or more downlink resources preceding the resource, and process 700 includes communicating in the resource on the downlink based at least in part on the one or more other resources preceding or succeeding the resource including the one or more downlink resources preceding the resource.

In a third aspect, alone or in combination with one or more of the first and second aspects, the one or more other resources preceding or succeeding the resource include one or more downlink resources succeeding the resource, and process 700 includes communicating in the resource on the downlink based at least in part on the one or more other resources preceding or succeeding the resource including the one or more downlink resources succeeding the resource.

In a fourth aspect, alone or in combination with one or more of the first through third aspects, the one or more other resources preceding or succeeding the resource include a downlink resource preceding the resource and an uplink resource succeeding the resource, and resolving the resource comprises resolving the resource as a gap resource based at least in part on the one or more other resources preceding or succeeding the resource including the downlink resource preceding the resource and the uplink resource succeeding the resource.

In a fifth aspect, alone or in combination with one or more of the first through fourth aspects, the one or more other resources preceding or succeeding the resource include a first downlink resource preceding the resource and a second downlink resource succeeding the resource, and process 700 includes communicating in the resource on the downlink based at least in part on the one or more other resources preceding or succeeding the resource including the first downlink resource preceding the resource and the second downlink resource succeeding the resource.

In a sixth aspect, alone or in combination with one or more of the first through fifth aspects, the one or more other resources preceding or succeeding the resource include one or more uplink resources preceding the resource, and process 700 includes communicating in the resource on the uplink based at least in part on the one or more other resources preceding or succeeding the resource including the one or more uplink resources preceding the resource.

In a seventh aspect, alone or in combination with one or more of the first through sixth aspects, the one or more other resources preceding or succeeding the resource include one or more uplink resources succeeding the resource, and process 700 includes communicating in the resource on the uplink based at least in part on the one or more other resources preceding or succeeding the resource including the one or more uplink resources succeeding the resource.

In an eighth aspect, alone or in combination with one or more of the first through seventh aspects, the one or more other resources preceding or succeeding the resource include an uplink resource preceding the resource and a downlink resource succeeding the resource, and resolving the resource comprises resolving the resource as a gap resource based at least in part on the one or more other resources preceding or succeeding the resource including the uplink resource preceding the resource and the downlink resource succeeding the resource.

In a ninth aspect, alone or in combination with one or more of the first through eighth aspects, the one or more other resources preceding or succeeding the resource include a first uplink resource preceding the resource and a second uplink resource succeeding the resource, and process 700 includes communicating in the resource on the downlink based at least in part on the one or more other resources preceding or succeeding the resource including the first uplink resource preceding the resource and the second uplink resource succeeding the resource.

In a tenth aspect, alone or in combination with one or more of the first through ninth aspects, the one or more other resources preceding or succeeding the resource include an uplink resource preceding the resource and a downlink resource succeeding the resource, and process 700 includes communicating in the resource on both the downlink and the uplink based at least in part on the one or more other resources preceding or succeeding the resource including the uplink resource preceding the resource and the downlink resource succeeding the resource.

In an eleventh aspect, alone or in combination with one or more of the first through tenth aspects, the one or more other resources preceding or succeeding the resource include a downlink resource preceding the resource and an uplink resource succeeding the resource, and process 700 includes communicating in the resource on both the downlink and the uplink based at least in part on the one or more other resources preceding or succeeding the resource including the downlink resource preceding the resource and the uplink resource succeeding the resource.

In a twelfth aspect, alone or in combination with one or more of the first through eleventh aspects, process 700 includes receiving an indication of a rule for resolving the resource, and resolving the resource comprises resolving the resource based at least in part on the rule.

In a thirteenth aspect, alone or in combination with one or more of the first through twelfth aspects, process 700 includes transmitting an indication of a rule for resolving the resource, and resolving the resource comprises resolving the resource in accordance with the rule.

In a fourteenth aspect, alone or in combination with one or more of the first through thirteenth aspects, process 700 includes receiving side control information associated with indicating the direction of the resource, wherein a time gap between receiving the side control information and an occurrence of the resource is less than a minimum time gap, and communicating in the resource on the downlink based at least in part on the time gap between receiving the side control information and the occurrence of the resource being less than the minimum time gap. Examples of side control information can include beamforming information, transmit power information, time division duplexing (TDD) configuration information, power control information, quality of service (QoS) information, quality of experience (QoE) information, or key performance indicator (KPI) information, among other examples.

In a fifteenth aspect, alone or in combination with one or more of the first through fourteenth aspects, process 700 includes receiving side control information associated with conveying a backhaul beam indication, and resolving the resource comprises resolving the resource based at least in part on a beam index associated with the backhaul beam indication.

In a sixteenth aspect, alone or in combination with one or more of the first through fifteenth aspects, process 700 includes receiving side control information indicating a default direction for a set of resources including the resource, and resolving the resource comprises resolving the resource based at least in part on the default direction, wherein the default direction is at least one of a sub-band-specific default direction, a beam-specific default direction, or a time-specific default direction.

In a seventeenth aspect, alone or in combination with one or more of the first through sixteenth aspects, process 700 includes receiving a set of slot format indicators, wherein the set of slot format indicators includes a first slot format indicator associated with a forwarding operation and a second slot format indicator associated with a mobile terminal operation, wherein the set of slot format indicators is associated with one or more type indicators identifying a type of operation for one or more slot format indicators of the set of slot format indicators.

In an eighteenth aspect, alone or in combination with one or more of the first through seventeenth aspects, the first slot format indicator differs from the second slot format indicator with regard to at least one of a slot format combination, a location within downlink control information, a reference subcarrier spacing, a passband for operation, or a configuration associated with the passband.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
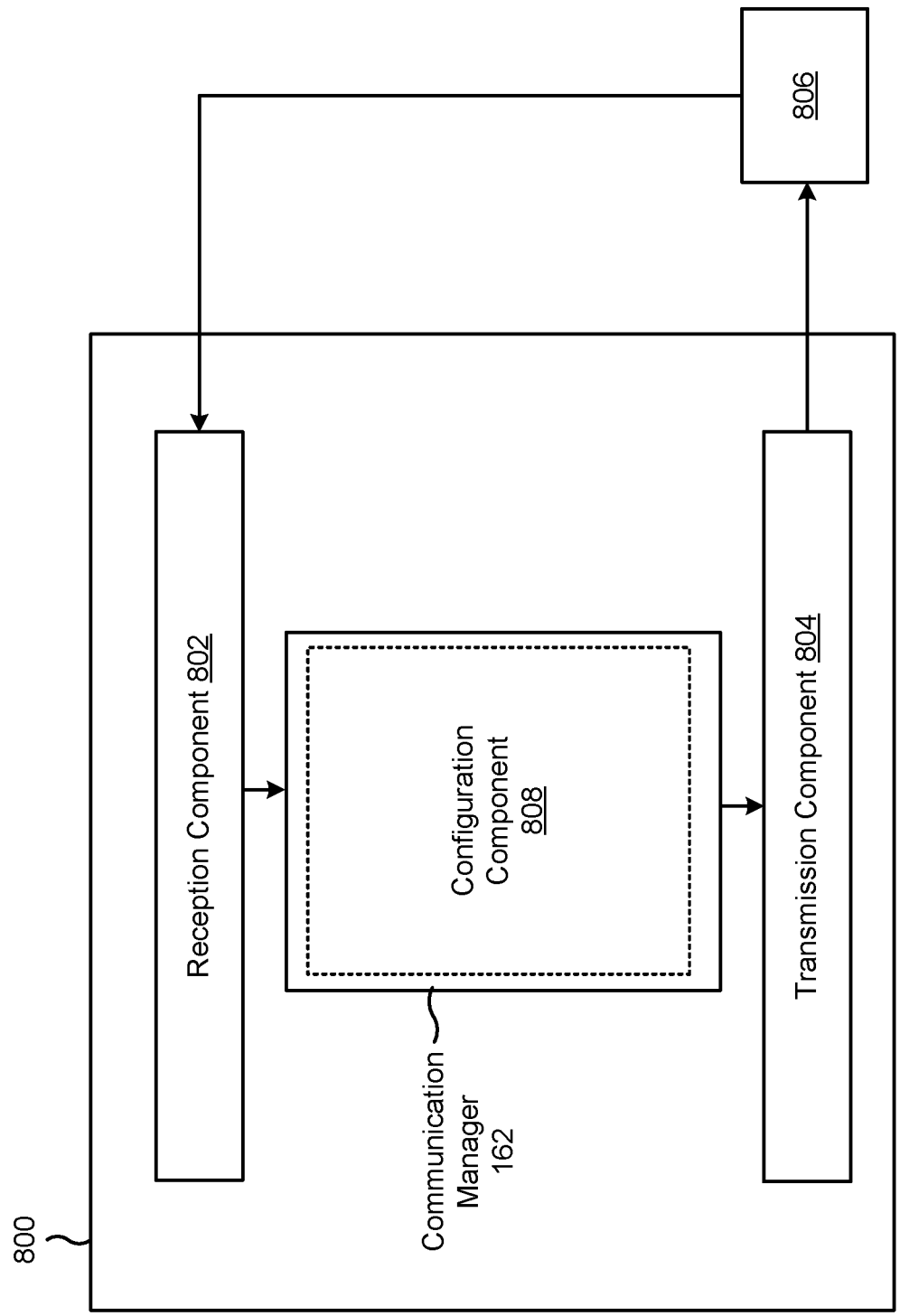
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a network controlled repeater, or a network controlled repeater may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, a network node, or another wireless communication device) using the reception component 802 and the transmission component 804. As further shown, the apparatus 800 may include the communication manager 162. The communication manager 162 may include a configuration component 808, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the network controlled repeater described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network controlled repeater described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network controlled repeater described in connection with FIG. 2. In some aspects, the transmission component 804 may be co-located with the reception component 802 in a transceiver.

The reception component 802 may receive information identifying a resource as a flexibly assigned resource, wherein the flexibly assigned resource is usable for an uplink or a downlink. The configuration component 808 may resolve the resource based at least in part on a direction of one or more other resources preceding or succeeding the resource. The reception component 802 may receive an indication of a rule for resolving the resource. The transmission component 804 may transmit an indication of a rule for resolving the resource. The reception component 802 may receive side control information associated with indicating the direction of the resource, wherein a time gap between receiving the side control information and an occurrence of the resource is less than a minimum time gap.

The reception component 802 or the transmission component 804 may communicate in the resource on the downlink based at least in part on the time gap between receiving the side control information and the occurrence of the resource being less than the minimum time gap. The reception component 802 may receive side control information associated with conveying a backhaul beam indication. The reception component 802 may receive side control information indicating a default direction for a set of resources including the resource. The reception component 802 may receive a set of slot format indicators, wherein the set of slot format indicators includes a first slot format indicator associated with a forwarding operation and a second slot format indicator associated with a mobile terminal operation, wherein the set of slot format indicators is associated with one or more type indicators identifying a type of operation for one or more slot format indicators of the set of slot format indicators.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by an apparatus of a network node, comprising: receiving information identifying a resource as a flexibly assigned resource, wherein the flexibly assigned resource is usable for an uplink or a downlink; and resolving the resource based at least in part on a direction of one or more other resources preceding or succeeding the resource.

Aspect 2: The method of Aspect 1, wherein the one or more other resources preceding or succeeding the resource and sharing a common symbol or slot with the resource include one or more flexibly assigned resources; and further comprising: communicating in the resource based at least in part on the direction of a symbol or slot preceding or succeeding the common symbol or slot.

Aspect 3: The method of any of Aspects 1 to 2, wherein the one or more other resources preceding or succeeding the resource include one or more downlink resources preceding the resource; and further comprising: communicating in the resource on the downlink based at least in part on the one or more other resources preceding or succeeding the resource including the one or more downlink resources preceding the resource.

Aspect 4: The method of any of Aspects 1 to 3, wherein the one or more other resources preceding or succeeding the resource include one or more downlink resources succeeding the resource; and further comprising: communicating in the resource on the downlink based at least in part on the one or more other resources preceding or succeeding the resource including the one or more downlink resources succeeding the resource.

Aspect 5: The method of any of Aspects 1 to 4, wherein the one or more other resources preceding or succeeding the resource include a downlink resource preceding the resource and an uplink resource succeeding the resource; and wherein resolving the resource comprises: resolving the resource as a gap resource based at least in part on the one or more other resources preceding or succeeding the resource including the downlink resource preceding the resource and the uplink resource succeeding the resource.

Aspect 6: The method of any of Aspects 1 to 5, wherein the one or more other resources preceding or succeeding the resource include a first downlink resource preceding the resource and a second downlink resource succeeding the resource; and further comprising: communicating in the resource on the downlink based at least in part on the one or more other resources preceding or succeeding the resource including the first downlink resource preceding the resource and the second downlink resource succeeding the resource.

Aspect 7: The method of any of Aspects 1 to 2, wherein the one or more other resources preceding or succeeding the resource include one or more uplink resources preceding the resource; and further comprising: communicating in the resource on the uplink based at least in part on the one or more other resources preceding or succeeding the resource including the one or more uplink resources preceding the resource.

Aspect 8: The method of any of Aspects 1 to 2, wherein the one or more other resources preceding or succeeding the resource include one or more uplink resources succeeding the resource; and further comprising: communicating in the resource on the uplink based at least in part on the one or more other resources preceding or succeeding the resource including the one or more uplink resources succeeding the resource.

Aspect 9: The method of any of Aspects 1 to 8, wherein the one or more other resources preceding or succeeding the resource include an uplink resource preceding the resource and a downlink resource succeeding the resource; and wherein resolving the resource comprises: resolving the resource as a gap resource based at least in part on the one or more other resources preceding or succeeding the resource including the uplink resource preceding the resource and the downlink resource succeeding the resource.

Aspect 10: The method of any of Aspects 1 to 2, wherein the one or more other resources preceding or succeeding the resource include a first uplink resource preceding the resource and a second uplink resource succeeding the resource; and further comprising: communicating in the resource on the downlink based at least in part on the one or more other resources preceding or succeeding the resource including the first uplink resource preceding the resource and the second uplink resource succeeding the resource.

Aspect 11: The method of any of Aspects 1 to 10, wherein the one or more other resources preceding or succeeding the resource include an uplink resource preceding the resource and a downlink resource succeeding the resource; and further comprising: communicating in the resource on both the downlink and the uplink based at least in part on the one or more other resources preceding or succeeding the resource including the uplink resource preceding the resource and the downlink resource succeeding the resource.

Aspect 12: The method of any of Aspects 1 to 11, wherein the one or more other resources preceding or succeeding the resource include a downlink resource preceding the resource and an uplink resource succeeding the resource; and further comprising: communicating in the resource on both the downlink and the uplink based at least in part on the one or more other resources preceding or succeeding the resource including the downlink resource preceding the resource and the uplink resource succeeding the resource.

Aspect 13: The method of any of Aspects 1 to 12, further comprising: receiving an indication of a rule for resolving the resource; and wherein resolving the resource comprises: resolving the resource based at least in part on the rule.

Aspect 14: The method of any of Aspects 1 to 12, further comprising: transmitting an indication of a rule for resolving the resource; and wherein resolving the resource comprises: resolving the resource in accordance with the rule.

Aspect 15: The method of any of Aspects 1 to 14, further comprising: receiving side control information associated with indicating the direction of the resource, wherein a time gap between receiving the side control information and an occurrence of the resource is less than a minimum time gap;

and further comprising: communicating in the resource on the downlink based at least in part on the time gap between receiving the side control information and the occurrence of the resource being less than the minimum time gap.

Aspect 16: The method of any of Aspects 1 to 15, further comprising: receiving side control information associated with conveying a backhaul beam indication; and wherein resolving the resource comprises: resolving the resource based at least in part on a beam index associated with the backhaul beam indication.

Aspect 17: The method of any of Aspects 1 to 16, further comprising: receiving side control information indicating a default direction for a set of resources including the resource; and wherein resolving the resource comprises: resolving the resource based at least in part on the default direction, wherein the default direction is at least one of: a sub-band-specific default direction, a beam-specific default direction, or a time-specific default direction.

Aspect 18: The method of any of Aspects 1 to 17, further comprising: receiving a set of slot format indicators, wherein the set of slot format indicators includes a first slot format indicator associated with a forwarding operation and a second slot format indicator associated with a mobile terminal operation, wherein the set of slot format indicators is associated with one or more type indicators identifying a type of operation for one or more slot format indicators of the set of slot format indicators.

Aspect 19: The method of Aspect 18, wherein the first slot format indicator differs from the second slot format indicator with regard to at least one of: a slot format combination, a location within downlink control information, a reference subcarrier spacing, a passband for operation, or a configuration associated with the passband.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network controlled repeater for wireless communication, comprising:
a memory; and
one or more processors, coupled to the memory, configured to:
receive information identifying a resource as a flexibly assigned resource, wherein the flexibly assigned resource is usable for uplink or downlink and the network controlled repeater lacks information indicating a direction used for communication in the flexibly assigned resource; and
resolve the direction of the flexibly assigned resource based at least in part on whether a direction of one or more other resources, preceding or succeeding the flexibly assigned resource, is a downlink direction or an uplink direction.

2. The network controlled repeater of claim 1, wherein the one or more other resources preceding or succeeding the flexibly assigned resource share a common symbol or slot with the flexibly assigned resource and include one or more flexibly assigned resources; and
wherein the one or more processors are further configured to:
communicate in the flexibly assigned resource based at least in part on a direction of a symbol or slot preceding or succeeding the common symbol or slot.

3. The network controlled repeater of claim 1, wherein the one or more other resources preceding or succeeding the flexibly assigned resource include one or more downlink resources preceding the flexibly assigned resource; and
wherein the one or more processors are further configured to:
communicate in the flexibly assigned resource on the downlink direction based at least in part on the one or more other resources preceding or succeeding the flexibly assigned resource including the one or more downlink resources preceding the flexibly assigned resource.

4. The network controlled repeater of claim 1, wherein the one or more other resources preceding or succeeding the flexibly assigned resource include one or more downlink resources succeeding the flexibly assigned resource; and
wherein the one or more processors are further configured to:
communicate in the flexibly assigned resource on the downlink direction based at least in part on the one or more other resources preceding or succeeding the flexibly assigned resource including the one or more downlink resources succeeding the flexibly assigned resource.

5. The network controlled repeater of claim 1, wherein the one or more other resources preceding or succeeding the flexibly assigned resource include a downlink resource preceding the flexibly assigned resource and an uplink resource succeeding the flexibly assigned resource; and
wherein the one or more processors, to resolve the direction of the flexibly assigned resource, are configured to:
resolve the flexibly assigned resource as a gap resource based at least in part on the one or more other resources preceding or succeeding the flexibly assigned resource including the downlink resource preceding the flexibly assigned resource and the uplink resource succeeding the flexibly assigned resource.

6. The network controlled repeater of claim 1, wherein the one or more other resources preceding or succeeding the flexibly assigned resource include a first downlink resource preceding the flexibly assigned resource and a second downlink resource succeeding the flexibly assigned resource; and
wherein the one or more processors are further configured to:
communicate in the flexibly assigned resource on the downlink direction based at least in part on the one or more other resources preceding or succeeding the flexibly assigned resource including the first downlink resource preceding the flexibly assigned resource and the second downlink resource succeeding the flexibly assigned resource.

7. The network controlled repeater of claim 1, wherein the one or more other resources preceding or succeeding the flexibly assigned resource include one or more uplink resources preceding the flexibly assigned resource; and
wherein the one or more processors are further configured to:
communicate in the flexibly assigned resource on the uplink direction based at least in part on the one or more other resources preceding or succeeding the flexibly assigned resource including the one or more uplink resources preceding the flexibly assigned resource.

8. The network controlled repeater of claim 1, wherein the one or more other resources preceding or succeeding the flexibly assigned resource include one or more uplink resources succeeding the flexibly assigned resource; and
wherein the one or more processors are further configured to:
communicate in the flexibly assigned resource on the uplink direction based at least in part on the one or more other resources preceding or succeeding the flexibly assigned resource including the one or more uplink resources succeeding the flexibly assigned resource.

9. The network controlled repeater of claim 1, wherein the one or more other resources preceding or succeeding the flexibly assigned resource include an uplink resource preceding the flexibly assigned resource and a downlink resource succeeding the flexibly assigned resource; and
wherein the one or more processors, to resolve the direction of the flexibly assigned resource, are configured to:
resolve the flexibly assigned resource as a gap resource based at least in part on the one or more other resources preceding or succeeding the flexibly assigned resource including the uplink resource preceding the flexibly assigned resource and the downlink resource succeeding the flexibly assigned resource.

10. The network controlled repeater of claim 1, wherein the one or more other resources preceding or succeeding the flexibly assigned resource include a first uplink resource preceding the flexibly assigned resource and a second uplink resource succeeding the flexibly assigned resource; and
wherein the one or more processors are further configured to:
communicate in the flexibly assigned resource on the downlink direction based at least in part on the one or more other resources preceding or succeeding the flexibly assigned resource including the first uplink resource preceding the flexibly assigned resource and the second uplink resource succeeding the flexibly assigned resource.

11. The network controlled repeater of claim 1, wherein the one or more other resources preceding or succeeding the flexibly assigned resource include an uplink resource preceding the flexibly assigned resource and a downlink resource succeeding the flexibly assigned resource; and
wherein the one or more processors are further configured to:
communicate in the flexibly assigned resource on both the downlink direction and the uplink direction based at least in part on the one or more other resources preceding or succeeding the flexibly assigned resource including the uplink resource preceding the flexibly assigned resource and the downlink resource succeeding the flexibly assigned resource.

12. The network controlled repeater of claim 1, wherein the one or more other resources preceding or succeeding the flexibly assigned resource include a downlink resource preceding the flexibly assigned resource and an uplink resource succeeding the flexibly assigned resource; and
wherein the one or more processors are further configured to:
communicate in the flexibly assigned resource on both the downlink direction and the uplink direction based at least in part on the one or more other resources preceding or succeeding the flexibly assigned resource including the downlink resource preceding the flexibly assigned resource and the uplink resource succeeding the flexibly assigned resource.

13. The network controlled repeater of claim 1, wherein the one or more processors are further configured to:
receive an indication of a rule for resolving the flexibly assigned resource; and
wherein the one or more processors, to resolve the direction of the flexibly assigned resource, are configured to:
resolve the direction of the flexibly assigned resource based at least in part on the rule.

14. The network controlled repeater of claim 1, wherein the one or more processors are further configured to:
transmit an indication of a rule for resolving the flexibly assigned resource; and
wherein the one or more processors, to resolve the direction of the flexibly assigned resource, are configured to:
resolve the direction of the flexibly assigned resource in accordance with the rule.

15. The network controlled repeater of claim 1, wherein the one or more processors are further configured to:
receive side control information associated with indicating the direction of the flexibly assigned resource, wherein a time gap between receiving the side control information and an occurrence of the flexibly assigned resource is less than a minimum time gap; and
wherein the one or more processors are further configured to:
communicate in the flexibly assigned resource on the downlink based at least in part on the time gap between receiving the side control information and the occurrence of the flexibly assigned resource being less than the minimum time gap.

16. The network controlled repeater of claim 1, wherein the one or more processors are further configured to:
receive side control information associated with conveying a backhaul beam indication; and
wherein the one or more processors, to resolve the direction of the flexibly assigned resource, are configured to:
resolve the direction of the flexibly assigned resource based at least in part on a beam index associated with the backhaul beam indication.

17. The network controlled repeater of claim 1, wherein the one or more processors are further configured to:
receive side control information indicating a default direction for a set of resources including the flexibly assigned resource; and
wherein the one or more processors, to resolve the direction of the flexibly assigned resource, are configured to:
resolve the direction of the flexibly assigned resource based at least in part on the default direction,
wherein the default direction is at least one of:
a sub-band-specific default direction,
a beam-specific default direction, or
a time-specific default direction.

18. The network controlled repeater of claim 1, wherein the one or more processors are further configured to:
receive a set of slot format indicators,
wherein the set of slot format indicators includes a first slot format indicator associated with a forwarding operation and a second slot format indicator associated with a mobile terminal operation, and
wherein the set of slot format indicators is associated with one or more type indicators identifying a type of operation for one or more slot format indicators of the set of slot format indicators.

19. The network controlled repeater of claim 18, wherein the first slot format indicator differs from the second slot format indicator with regard to at least one of:
a slot format combination,
a location within downlink control information,
a reference subcarrier spacing,
a passband for operation, or
a configuration associated with the passband.

20. A method of wireless communication performed by an apparatus of a network controlled repeater, comprising:
receiving information identifying a resource as a flexibly assigned resource, wherein the flexibly assigned resource is usable for uplink or downlink and the network controlled repeater lacks information indicating a direction used for communication in the flexibly assigned resource; and
resolving the direction of the flexibly assigned resource based at least in part on whether a direction of one or more other resources, preceding or succeeding the flexibly assigned resource, is a downlink direction or an uplink direction.

21. The method of claim 20, wherein the one or more other resources preceding or succeeding the flexibly assigned resource share a common symbol or slot with the flexibly assigned resource and include one or more flexibly assigned resources; and
further comprising:
communicating in the flexibly assigned resource based at least in part on a direction of a symbol or slot preceding or succeeding the common symbol or slot.

22. The method of claim 20, wherein the one or more other resources preceding or succeeding the flexibly assigned resource include one or more downlink resources preceding the flexibly assigned resource; and
further comprising:
communicating in the flexibly assigned resource on the downlink direction based at least in part on the one or more other resources preceding or succeeding the flexibly assigned resource including the one or more downlink resources preceding the flexibly assigned resource.

23. The method of claim 20, wherein the one or more other resources preceding or succeeding the flexibly assigned resource include one or more downlink resources succeeding the flexibly assigned resource; and
further comprising:
communicating in the flexibly assigned resource on the downlink direction based at least in part on the one or more other resources preceding or succeeding the flexibly assigned resource including the one or more downlink resources succeeding the flexibly assigned resource.

24. The method of claim 20, wherein the one or more other resources preceding or succeeding the flexibly assigned resource include a downlink resource preceding the flexibly assigned resource and an uplink resource succeeding the flexibly assigned resource; and
   wherein resolving the direction of the flexibly assigned resource comprises:
     resolving the flexibly assigned resource as a gap resource based at least in part on the one or more other resources preceding or succeeding the flexibly assigned resource including the downlink resource preceding the flexibly assigned resource and the uplink resource succeeding the flexibly assigned resource.

25. The method of claim 20, wherein the one or more other resources preceding or succeeding the flexibly assigned resource include a first downlink resource preceding the flexibly assigned resource and a second downlink resource succeeding the flexibly assigned resource; and
   further comprising:
     communicating in the flexibly assigned resource on the downlink direction based at least in part on the one or more other resources preceding or succeeding the flexibly assigned resource including the first downlink resource preceding the flexibly assigned resource and the second downlink resource succeeding the flexibly assigned resource.

26. The method of claim 20, wherein the one or more other resources preceding or succeeding the flexibly assigned resource include one or more uplink resources preceding the flexibly assigned resource; and
   further comprising:
     communicating in the flexibly assigned resource on the uplink direction based at least in part on the one or more other resources preceding or succeeding the flexibly assigned resource including the one or more uplink resources preceding the flexibly assigned resource.

27. The method of claim 20, wherein the one or more other resources preceding or succeeding the flexibly assigned resource include one or more uplink resources succeeding the flexibly assigned resource; and
   further comprising:
     communicating in the flexibly assigned resource on the uplink direction based at least in part on the one or more other resources preceding or succeeding the flexibly assigned resource including the one or more uplink resources succeeding the flexibly assigned resource.

28. A non-transitory computer-readable medium storing a set of instructions for wireless communication, the set of instructions comprising:
   one or more instructions that, when executed by one or more processors of a network controlled repeater, cause the network controlled repeater to:
     receive information identifying a resource as a flexibly assigned resource, wherein the flexibly assigned resource is usable for uplink or downlink and the network controlled repeater lacks information indicating a direction used for communication in the flexibly assigned resource; and
     resolve the direction of the flexibly assigned resource based at least in part on whether a direction of one or more other resources, preceding or succeeding the flexibly assigned resource, is a downlink direction or an uplink direction.

29. An apparatus for wireless communication, comprising:
   means for receiving information identifying a resource as a flexibly assigned resource, wherein the flexibly assigned resource is usable for uplink or downlink and the apparatus lacks information indicating a direction used for communication in the flexibly assigned resource; and
   means for resolving the direction of the flexibly assigned resource based at least in part on whether a direction of one or more other resources, preceding or succeeding the flexibly assigned resource, is a downlink direction or an uplink direction.

30. The method of claim 20, wherein the one or more other resources preceding or succeeding the flexibly assigned resource include one or more uplink resources succeeding the flexibly assigned resource; and
   further comprising:
     communicating in the flexibly assigned resource on the uplink direction based at least in part on the one or more other resources preceding or succeeding the flexibly assigned resource including the one or more uplink resources succeeding the flexibly assigned resource.

* * * * *